US006420844B1

United States Patent
Shin

(10) Patent No.: US 6,420,844 B1
(45) Date of Patent: Jul. 16, 2002

(54) METHOD FOR DETECTING POSITION OF BRUSHLESS DIRECT CURRENT MOTOR

(75) Inventor: Hyeon Jae Shin, Kimhae (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/718,172

(22) Filed: Nov. 21, 2000

(30) Foreign Application Priority Data

Nov. 30, 1999 (KR) ............................................. 99-53807

(51) Int. Cl.[7] .................................................. H02P 6/18
(52) U.S. Cl. ...................................... 318/439; 318/254
(58) Field of Search ................................ 318/138, 254, 318/439, 459, 500, 720, 721, 722, 724; 388/928.1

(56) References Cited

U.S. PATENT DOCUMENTS

| | | | | |
|---|---|---|---|---|
| 5,057,753 A | * | 10/1991 | Leuthold et al. ............. | 318/254 |
| 5,635,810 A | * | 6/1997 | Goel ............................ | 318/719 |
| 5,783,917 A | * | 7/1998 | Takekawa .................... | 318/439 |
| 5,886,485 A | * | 3/1999 | Jang ............................. | 318/254 |
| 5,929,577 A | * | 7/1999 | Neidorff et al. ............. | 318/254 |

\* cited by examiner

Primary Examiner—Bentsu Ro
(74) Attorney, Agent, or Firm—Ostrolenk, Faber, Gerb & Soffen LLP

(57) ABSTRACT

The present invention relates to a method for detecting position of a BLDC (Brushless Direct Current) motor which is capable of decreasing position detecting errors by detecting accurately a crossing time point of a back electromotive force and reference potential by using. a phase voltage outputted from the BLDC motor regardless of an ON/OFF operation of a PWM (Pulse Width Modufation) signal inputted to the BLDC motor, accordingly the present invention can stably operate the BLDC motor, lower power consumption and noise of an equipment installed the BLDC motor stably operating.

4 Claims, 4 Drawing Sheets

METHOD FOR DETECTING POSITION OF BRUSHLESS DIRECT CURRENT MOTOR

BACKGROUND OF THE INVENTION

1. Field of the Invention

The present invention relates to a BLDC (Brushless Direct Current) motor, in particular to a method for detecting position of the BLDC motor which is capable of detecting position of a rotor of the BLDC motor when a phase voltage outputted from the BLDC motor is "0".

2. Description of the Prior Art

FIG. 1 is a block diagram illustrating a construction of an apparatus for detecting position of a BLDC (Brushless Direct Current) motor according to the conventional technology. As depicted in FIG. 1, the apparatus comprises a position detecting pulse generation unit 11 outputting a position detecting pulse by being inputted a phase voltage generated when the BLDC motor operates and comparing it with a reference potential set in advance, a micro computer 12 controlling the BLDC motor in accordance with a position signal after recognizing an output of the position detecting pulse generation unit 11 as the position signal, its operation will now be described in detail with reference to FIG. 2.

FIGS. 2A through 2C are wave form diagrams illustrating wave forms of the each output signal in FIG. 1.

First, the BLDC motor controlled by a PWM (Pulse Width Modulation) signal generates a back electromotive force while operating. Herein, the phase voltage is equal to the back electromotive force of the BLDC motor 10 when the PWM signal applied to the BLDC motor 10 is in the ON state, the phase voltage is "0" when the PWM signal is in the OFF state and the phase voltage is generated as three phases and are separately inputted to the position detecting pulse generation unit 11. The position detecting pulse generation unit 11 outputs the position detecting pulse by using the inputted three phases (Ref. FIG. 2A).

The position detecting pulse generation unit 11 outputs the position detecting pulse to the micro computer 12 which is a "high potential" when the phase voltage is bigger than a reference potential Vf, or is a "low potential" when the phase voltage is smaller than the reference potential Vf.

After that, the micro computer 12 detects a time point when the position detecting pulse is became the "high potential" initially by an interrupt signal, determines the time point as a position detecting time point of the BLDC motor 10, and operates the BLDC motor by controlling a driving unit (not shown) in accordance with the position detecting time point.

However, as depicted in FIG. 2C, in the apparatus for detecting position of the BLDC motor according to the conventional technology, when the phase voltage outputted from the motor is "0", the position detecting pulse generation unit 11 can not detecting the time point when the back electromotive force is bigger than the reference potential, accordingly a position detecting error Δt occurs.

SUMMARY OF THE INVENTION

The object of the present invention is to provide a method for detecting position of a BLDC (Brushless Direct Current) motor which is capable of detecting accurately a crossing time point of a back electromotive force and a reference potential by using a phase voltage outputted from the BLDC motor regardless of ON/OFF operation of a PWM (Pulse Width Modulation) signal inputted to the BLDC motor.

In order to achieve the object, the method of the present invention comprises a storing step storing the phase voltage outputted from the motor as a previous phase voltage with a detecting time detecting it when the phase voltage outputted from the motor is smaller than a reference potential set in advance, and a determining step determining a position detecting time point by using the stored detecting time after storing the phase voltage outputted from the motor as the present voltage when the phase voltage outputted from the motor is bigger than the reference potential set in advance.

DETAILED DESCRIPTION OF THE PREFERRED EMBODIMENT

Figure 1:
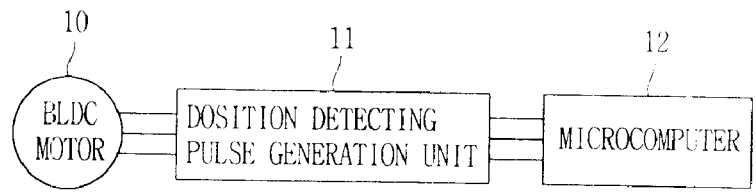
FIG. 1 is a block diagram illustrating a construction of an apparatus for detecting position of a BLDC motor according to the conventional technology.
Figure 2A:
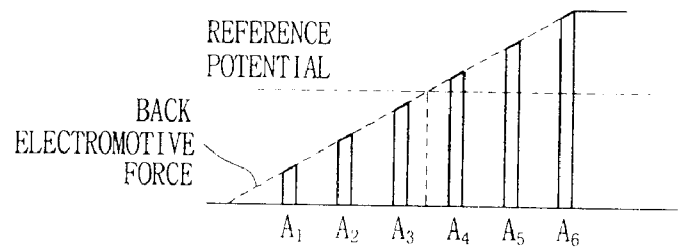
FIGS. 2A through 2C are wave form diagrams illustrating wave forms of the each out signal.
Figure 2B:
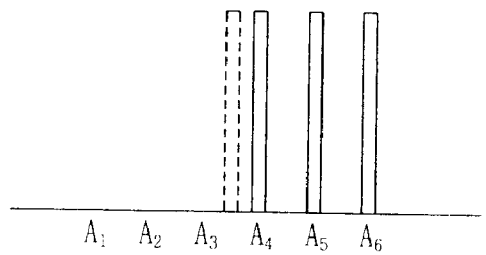
Figure 2C:
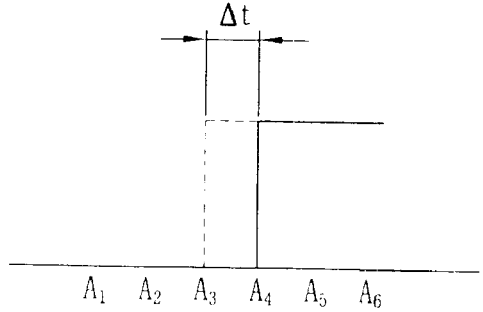
Figure 3:
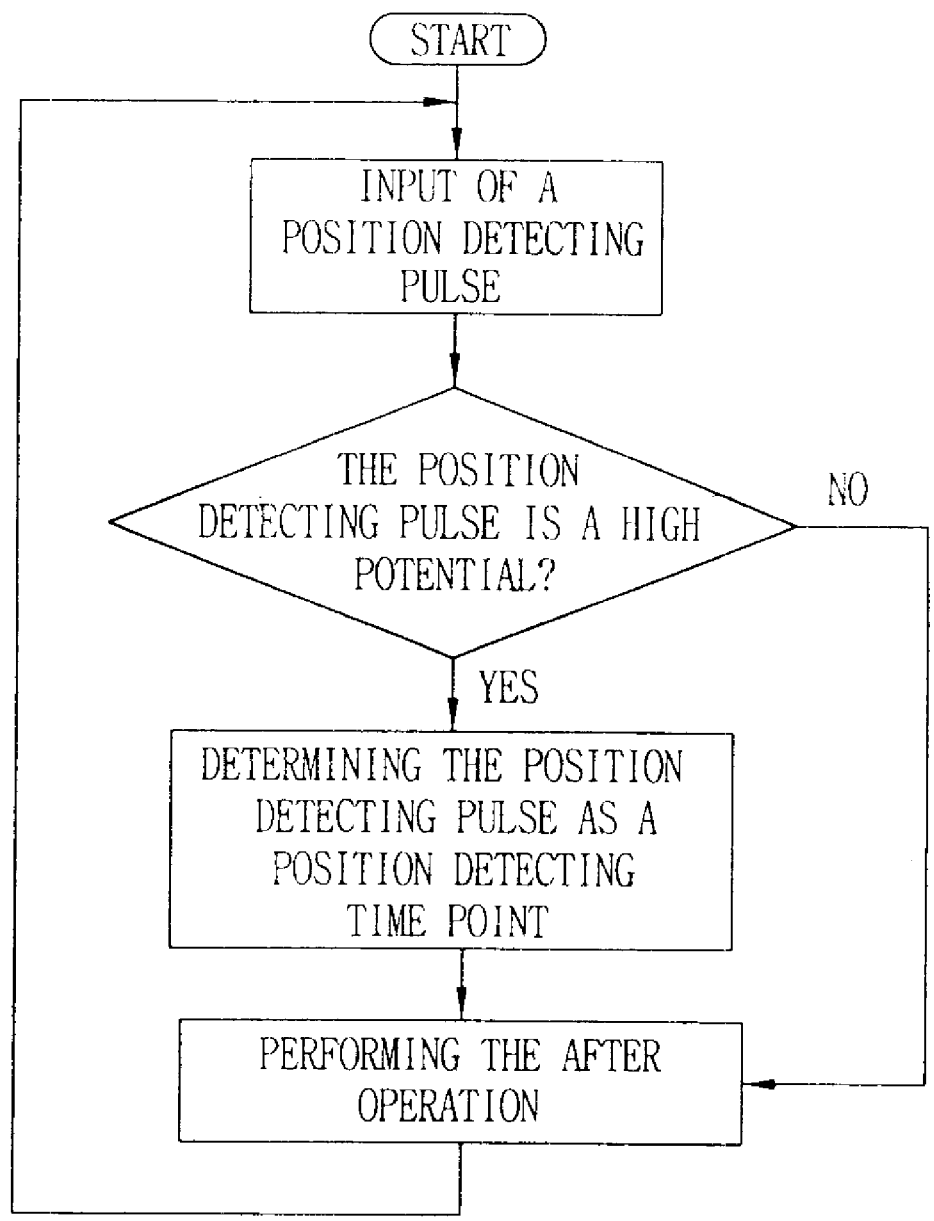
FIG. 3 is a wave form diagram illustrating a method for detecting position of the BLDC motor according to the conventional technology.
Figure 4:
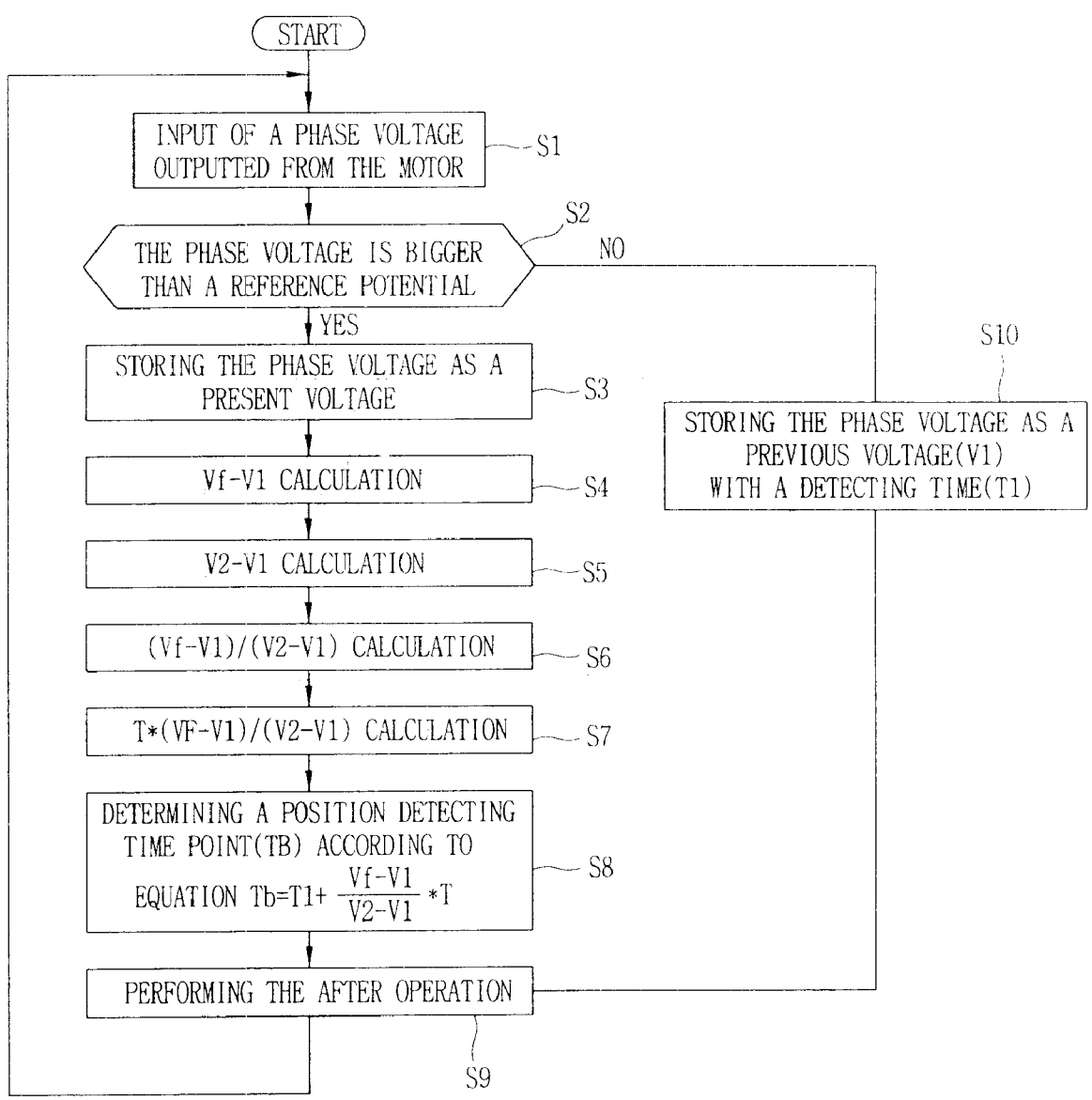
FIG. 4 is a flow chart illustrating a method for detecting position of the BLDC motor according to the embodiment of the present invention.

FIG. 4 is a flow chart illustrating a method for detecting position of a BLDC (Brushless Direct Current) motor according to the embodiment of the present invention. The method will now be described in detail.

First, when a phase voltage outputted from the motor is inputted S1, the phase voltage is compared with a reference potential Vf S2.

In the comparing step S2, when the phase voltage is smaller than the reference potential Vf, the phase voltage is stored as a previous voltage V1 with a detecting time T1 S10, and an after operation is performed S9.

In the comparing step S2, when the inputted phase voltage is bigger than the reference potential Vf, the inputted phase voltage is stored as a present phase voltage V2 S3, and the difference between the reference potential Vf and the previous phase voltage V1 is calculated S4.

After that, the difference between the stored present phase voltage V2 and previous phase voltage V1 is calculated S5.

The remainder of the S5 is divided by the remainder of the S4 S6.

After that, the value of the S6 is multiplied by a PWM (Pulse Width Modulation) cycle of the phase voltage T S7.

A position detecting time point Tb is determined by adding the value of the S7 to the detecting time T1 detecting the inputted phase voltage, and the after operation is performed S9.

Figure 5:
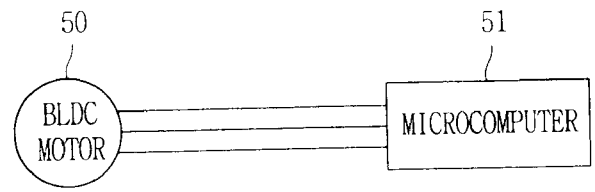
FIG. 5 is a block diagram illustrating an apparatus for detecting position of the BLDC motor in FIG. 4.

FIG. 5 is a block diagram illustrating an apparatus for detecting position of the BLDC motor in FIG. 4, its operation will now be described with reference to FIG. 6.

Figure 6A:
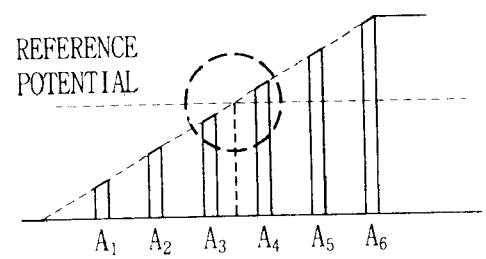
FIGS. 6A and 6B are wave form diagrams illustrating wave forms of input signals of a microcomputer.
Figure 6B:
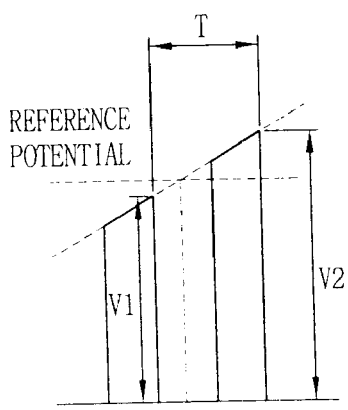

FIGS. 6A and 6B are wave form diagrams illustrating wave forms of input signals of a microcomputer.

As depicted in FIG. 5, the microcomputer 51 comprised in FIG. 5 controls the BLDC motor 50 by detecting a position of a rotor of the BLDC motor 50 by comparing the phase voltage generated while the BLDC motor operates with the reference potential Vf set in advance, and its operation will now be described.

First, the BLDC motor 50 controlled in accordance with the PWM (Pulse width Modulation) signal generates a back electromotive force while operating. Herein, when the PWM signal applied to the BLDC motor is in the ON state, the back electromotive force of the BLDC motor 50 is equal to the phase voltage, when the PWM signal is in the OFF state, the phase voltage is "0" and is generated as three phases, and the three phases are separately inputted to the microcomputer (Ref. FIG. 6A).

The microcomputer 51 adopts below Equation 1, 2 in order to determine a position detecting time point (Tb) after detecting position of the rotor of the BLDC motor 50 (Ref. FIG. 6B).

$$T:(V2-V1)=(Tb-T1):(Vf-V1) \quad \text{[Equation 1]}$$

$$Tb = T1 + \frac{Vf - V1}{V2 - V1} \times T \quad \text{[Equation 2]}$$

Herein, Tb is the position detecting time point, T1 is the detecting time, Vf is the reference potential, V1 is the previous phase voltage, V2 is the present phase voltage, T is the cycle of the phase voltage outputted from the BLDC motor, the equations will now be described in detail.

The microcomputer 51 is inputted the phase voltage outputted from the BLDC motor 50 and converts it into a digital signal through a digital converter (not shown).

When the phase voltage converted into the digital signal is smaller than the reference potential Vf, it is regarded as the previous phase voltage V1 and is stored on a memory (not shown) with the detecting time T1.

In addition, the microcomputer 51 repeatedly stores the previous phase voltage V1 and detecting time T1 until the phase voltage outputted from the BLDC motor 50 is bigger than the reference potential Vf. Herein, when the phase voltage converted into the digital signal is bigger than the reference potential Vf for the first time, it is stored on the memory (not shown) as the present phase voltage V2.

After that, difference between the reference potential Vf and previous phase voltage V1 is calculated, and difference between the present phase voltage V2 and previous phase voltage V1 is calculated.

The remainder between the reference potential Vf and previous phase voltage V1 is divided by the remainder between the present phase voltage V2 and previous phase voltage V1, and the value is multiplied by the cycle of the PWM of the phase voltage.

After that, the multiplied value is added to the detecting time T1, thus the added value is the position detecting time point Tb.

As described above, the method for detecting the position of the BLDC motor of the present invention is capable of detecting more accurately the position of the rotor of the BLDC motor by detecting the position detecting time point Tb by being directly inputted the phase voltage outputted from BLDC motor on the microcomputer.

In addition, the method is capable of operating stably the BLDC motor by decreasing position detecting errors in detecting the rotor of the BLDC motor by using the phase voltage outputted from the BLDC motor.

The present invention is capable of decreasing power consumption of an equipment installed the BLDC motor operating stably.

In addition, the present invention is capable of preventing noise of an equipment installed the BLDC motor operating stably.

What is claimed is:

1. A method for detecting positions of a BLDC (Brushless Direct Current) motor, comprising:

comparing a phase voltage outputted from a motor with a reference potential set in advance; and determining a position detecting time point by using the result of the comparing step, the position detecting time point being determined according to:

$$Tb = T1 + \frac{Vf - V1}{V2 - V1} \times T$$

wherein, Tb is the position detecting time point, T1 is the detecting time, Vf is the reference potential, V1 is the previous phase voltage, V2 is the present phase voltage, and T is the cycle of the phase voltage outputted from the BLDC motor.

2. The method according to claim 1, wherein the comparing step comprises the step of:

storing the phase voltage outputted from the motor as a previous phase voltage with a detecting time detecting the phase voltage outputted from the motor when the phase voltage outputted from the motor is smaller than the reference potential set in advance.

3. The method according to claim 2, wherein the determining step comprises the step of:

determining the position detecting time point by using the detecting time stored with the previous phase voltage after storing the phase voltage as a present voltage when the phase voltage outputted from the motor is bigger than the reference potential set in advance.

4. A method for detecting positions of a BLDC motor, comprising:

storing a phase voltage outputted from a motor as a previous phase voltage with a detecting time detecting the phase voltage when the phase voltage outputted from the motor is smaller than a reference potential set in advance; and determining a position detecting time point by using the stored detecting time after storing the phase voltage as the present voltage when the phase voltage outputted from the motor is bigger than the reference potential set in advance, the position detecting time point being determined according to:

$$Tb = T1 + \frac{Vf - V1}{V2 - V1} \times T$$

wherein, Tb is the position detecting time point, T1 is the detecting time, Vf is the reference potential, V1 is the previous phase voltage, V2 is the present phase voltage, and T is the cycle of the phase voltage outputted from the BLDC motor.

* * * * *